US009330132B2

(12) United States Patent
Leto et al.

(10) Patent No.: US 9,330,132 B2
(45) Date of Patent: May 3, 2016

(54) SYSTEMS AND METHODS FOR A TRANSACTIONAL-BASED WORKFLOW COLLABORATION PLATFORM

(71) Applicants: Anthony Leto, Los Gatos, CA (US); Andrey Lagunov, London (GB)

(72) Inventors: Anthony Leto, Los Gatos, CA (US); Andrey Lagunov, London (GB)

(*) Notice: Subject to any disclaimer, the term of this patent is extended or adjusted under 35 U.S.C. 154(b) by 131 days.

(21) Appl. No.: 13/663,302

(22) Filed: Oct. 29, 2012

(65) Prior Publication Data

US 2014/0122416 A1   May 1, 2014

(51) Int. Cl.
*G06F 17/30* (2006.01)
*G06F 21/62* (2013.01)
*G06Q 10/10* (2012.01)

(52) U.S. Cl.
CPC ...... *G06F 17/30377* (2013.01); *G06F 21/6218* (2013.01); *G06Q 10/103* (2013.01); *G06F 2221/2113* (2013.01)

(58) Field of Classification Search
CPC .............. G06Q 30/0601; G06Q 30/00; G06Q 30/0635; G06Q 10/083; G06Q 10/0835; G06Q 10/0875; G06Q 10/101; G06Q 10/103; G06F 21/6227; G06F 17/30377; G06F 21/6218; G06F 2221/0773; Y10S 707/99939
USPC ........................................................ 705/26.1
See application file for complete search history.

(56) References Cited

U.S. PATENT DOCUMENTS

| 7,069,234 | B1* | 6/2006 | Cornelius et al. | 705/80 |
|---|---|---|---|---|
| 7,624,125 | B2* | 11/2009 | Feinsmith | |
| 8,224,859 | B2* | 7/2012 | Guyan et al. | 707/791 |
| 2002/0178074 | A1* | 11/2002 | Bloom | 705/26 |
| 2008/0071646 | A1* | 3/2008 | Hodson et al. | 705/27 |
| 2010/0106546 | A1* | 4/2010 | Sproule | 705/7 |
| 2010/0274606 | A1* | 10/2010 | Fain et al. | 705/7 |
| 2011/0191199 | A1* | 8/2011 | Barua et al. | 705/26.1 |
| 2011/0258083 | A1* | 10/2011 | Ren | 705/27.1 |
| 2012/0259722 | A1* | 10/2012 | Mikurak | 705/26.1 |
| 2014/0006129 | A1* | 1/2014 | Heath | 705/14.23 |

* cited by examiner

*Primary Examiner* — Leslie Wong
(74) *Attorney, Agent, or Firm* — Raubvogel Law Office

(57) ABSTRACT

A system and method to share data associated with a transaction are disclosed. In some embodiments, a database record may be associated with a transaction corresponding to a product. The database record may include a plurality of data fields and the transaction may be associated with a plurality of entities. The data fields of the record may be made available to each of the entities based on a role of the entities in the transaction. As such, different data fields may be displayed to different entities. Furthermore, various sharing techniques may be performed with the data fields of the record.

21 Claims, 8 Drawing Sheets

| | Find Products ☐ | | 305 | | | | | | |
|---|---|---|---|---|---|---|---|---|---|
| | iTrac Rel | PO/SO | COO | Sender | Receiver | Destination | Carrier | Export Date | Incoterm |
| 311 | iTRAC0001205 | H378978B1 | US | Apple Computer Inc. | GB | Telefonia | Plaza Del Fuentes, Madrid | UPS | XFR6545645 |
| 312 | iTRAC0001206 | H978978B1 | IE | Sandisk | BR | Telefonia | Plaza Del Fuentes, Madrid | HLX | FRF5648774 |
| 313 | iTRAC0001205 | H978978B1 | US | Telefonia | GB | Dell Computers | Austin, Texas | DHL | XFR6545645 |

Transaction Details 320

| iTRAC ID | Import ID | Export ID |
|---|---|---|

Shipping Label 330

Export Date  334   Incoterm _____   Po No _____
Sender  331    Carrier  332    Receiver  333
Country of Origin: Aruba   Int. Airway Bill No: ____   Ultimate Dest: ____

Packing List 340

Shipment Size | Special Requirements
No. Boxes: 5 | This shipment contains fragile electronic goods and must be kept in dry conditions above 18 degrees celcius Add Item US Compliance: These goods were exported from the United States in accordance with the Export Admin regulations | Total Weight:

Commercial Invoice 350

Shipment Size | Special Requirements
No. Boxes: 5 | This shipment contains fragile electronic goods and must
Total Weight: 230kg | be kept in dry conditions above 18 degrees celcius Product ID  Product Title  HTS Code  ECCN  COOO  Quantity  Unit Net Value  Total Net Value Add Item | Total Quantity:
US Compliance: These goods were exported from the United States in accordance with the Export Admin regulations | Total Value:

Declaration: I hereby certify that this invoice shows the actual price of the goods described, that no other invoice has been issued, and that the particulars of the invoice are true and correct.

Signature of Shipper/Exporter
John Smith

Manually Upload Documents 360

Type     Document
Add Document iTrac Wizard 365

Shipping Label ☐
Export Date ☐
Incoterm ☐
PO No. ☐
Sender Address (+DPL Check) ☐
Carrier ☐
Receiver Address (+DPL Check) ☐
COO ☐
AWB No. ☐
Co. Ultimate Dest. ☐
Packing List ☐
Commercial Invoice ☐

Transaction Comments 370

Tom Jones (O2) – 4hrs ago
Can we get a status update on why this hasn't shipped yet?

John C. Pittman (Apple) – 4hrs ago
This shipment is held up in customs because there is a strike at the airport and they can't load it.

Add a comment ☐

People with Access 380

| Name | Company | Last Activity |
|---|---|---|
| John C Pittman | Apple | Logged in |
| Tom Jones | O2 | 2hrs ago |

Add User

Additional Documents 390

| Filename | Date |
|---|---|
| document.pdf | 22/12/2011 |

Add Documents

FIG.3

SYSTEMS AND METHODS FOR A TRANSACTIONAL-BASED WORKFLOW COLLABORATION PLATFORM

FIELD

The present disclosure relates to systems and methods for a workflow. In some embodiments, the present disclosure relates to systems and methods for a transactional-based workflow collaboration platform.

BACKGROUND

Conventional workflow platforms (e.g., traditional electronic data interchanges) typically comprise a database containing a plurality of records. If a user of the conventional workflow platform wants to share a record of the conventional workflow platform with a second user, then the entire record must be shared with the second user. Furthermore, conventional workflow platforms do not support a level of interaction between users to collaboratively build on the record associated with a transaction.

As such, it is desirable to develop systems and methods of systems and methods for implementing a transactional-based workflow collaboration platform.

SUMMARY

The present disclosure introduces systems and methods for a transactional-based workflow collaboration platform.

The systems or methods may receive a record associated with at least one transaction. In some embodiments, the transaction may be an import or export of a physical product between a plurality of physical locations. The record may have a plurality of data fields. A plurality of users associated with the transaction may be identified and the data fields of the record associated with the transaction available to each of the users may be determined. A request from a first user to display information associated with the transaction may be received and the data fields of the record may be displayed based on the determination of the data fields of the record that are available to the first user.

In some embodiments, the determination of the data fields of the record available to the first is based on a role of the first user for the transaction. A first role and a second role may be associated with different available data fields.

In some embodiments, a first data field is available to the first user and a second user. A modification to the first data field may be received from the first user and a notice may be transmitted to the second user in response to the modification to the first data field by the first user.

In some embodiments, a task may be assigned to the first user where the task comprises at least one data field for the first user to input information. A notice may be transmitted to the first user in response to the assigning of the task.

In some embodiments, a first data field is available to the first user and an input from the first user to share the first data field with a second user may be received. An input from the second user to share the first data field with a third user may further be received.

In some embodiments, a notice is transmitted to the first user in response to the input from the second user to share the first data field with the third user. Furthermore, the first data field is available to the third user if the first user indicates an acceptance to the notice.

BRIEF DESCRIPTION OF THE DRAWINGS

The novel features of the disclosure are set forth in the appended claims. However, for purpose of explanation, several embodiments of the disclosure are set forth in the following figures.

FIG. 3 depicts an example user interface for a user of a transactional-based workflow collaboration platform in accordance with some embodiments.

DETAILED DESCRIPTION

The systems and methods disclosed herein relate to a transactional-based workflow collaboration platform.

In the following detailed description, numerous specific details are set forth in order to provide a thorough understanding of the present disclosure. However, it will become obvious to those skilled in the art that the present disclosure may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present disclosure.

Figure 1:
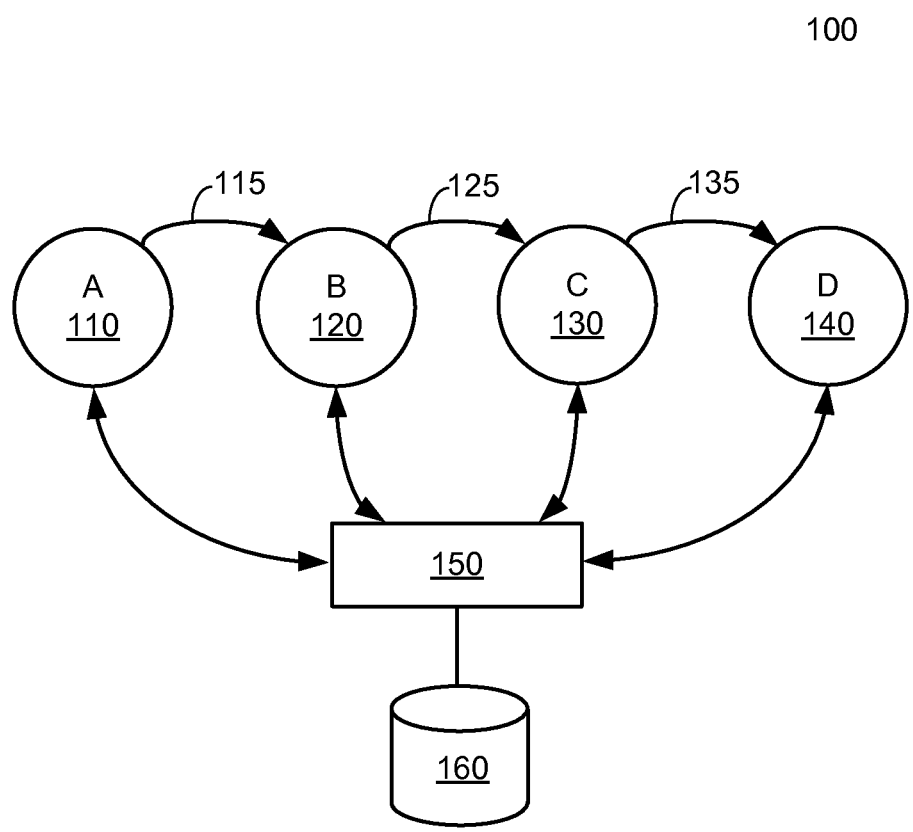
FIG. 1 is a block diagram of an example import and export compliance environment in accordance with some embodiments.

FIG. 1 is a block diagram of an example import and export compliance environment 100 in accordance with some embodiments. In general, the environment 100 comprises a plurality of locations associated with a plurality of partner entities for collaborating on a transaction.

As shown in FIG. 1, the environment 100 may comprise a plurality of locations 110, 120, 130, and 140. In some embodiments, each location 110, 120, 130, and 140 may be associated with at least one user (e.g., a partner entity). For example, the location 110 may be associated with a first partner entity, location 120 may be associated with a second partner entity, location 130 may be associated with a third partner entity, and location 140 may be associated with a fourth partner entity. In some embodiments, a transaction may comprise a task related to the shipment of a product. In the same or alternative embodiments, the transaction may comprise a plurality of collaborative activities or tasks from a plurality of partner entities. For example, the transaction may comprise a goal of having a product delivered at the location 140. In some embodiments, the transaction to have the product delivered at the location 140 may comprise a plurality of associated transactions 115, 125, and 135. For example, the transaction to have the product delivered at location 140 may comprise the associated transaction 115 involving a first partner entity shipping a product from location 110 to a second partner entity at location 120, an associated transaction 125 involving the second partner entity shipping a product (e.g., the same product, a modification of the product, or service performed on the product, etc.) from the location 120 to a third partner entity at the location 130, and the associated transaction 135 involving the third partner entity shipping a product from the location 130 to a fourth partner entity at the location 140. As such, the transaction to have a product delivered at the location 140 may comprise a plurality of associated transactions (i.e., sub-transactions), a plurality of locations, and a plurality of partner entities.

As is evident from the above disclosure, the transaction of having a product delivered at location 140 may prove to be complex. For example, each of the partner entities at the locations 110, 120, 130, and 140 may each require different information or data relating to the product or the associated transaction that the partner entity must perform as part of the chain to accomplish the goal of the transaction. In some embodiments, the partner entities may require shipping information (e.g., the first partner entity may require shipping information to deliver a product to the second partner entity), product information for import and/or compliance requirements, etc. As such, in some embodiments, a centralized user platform 150 may facilitate such transactions as disclosed above. In some embodiments, each of the partner entities may use the user platform 150 in order to accomplish a task or associated transaction associated with the partner entity. For example, the partner entities may use the user platform 150 to receive and/or transmit shipment information, product information, and/or import and export compliance information. In some embodiments, the user platform 150 may be coupled to a database 160 that may store product, shipment, and transaction data. As such, the user platform 150 may facilitate a transactional-based workflow.

In some embodiments, the user platform 150 may control an amount of information available and displayed to each of the partner entities. For example, a user (e.g., an originator of a transaction) may determine which amount of information from the database 160 may be available and displayed to each of the partner entities. In some embodiments, the amount of information from the database 160 that is available and displayed to each of the partner entities may be based on the transaction and type of partner entity (e.g., whether the partner entity is a broker, seller, shipper, vendor, etc.). For example a first partner entity that ships a product may require different information from the database 160 than a second partner entity that receives the product. In some embodiments, the first partner entity may require a shipping address and export compliance information and the second partner entity may require import compliance information. In the same or alternative embodiments, an originator of the transaction (e.g., a user) may selectively share information from the database 160 with the various partner entities by using the user platform 150.

In some embodiments, the database 160 may comprise information or data from a plurality of databases. For example, the user platform 150 may retrieve data from a plurality of external databases and organize the retrieved data into one or more data fields of one or more dynamic tiles as further discussed with regard to FIG. 3. For example, each of the external databases may be associated with a separate administrative entity and/or a different location. In some embodiments, each of the locations may be associated with a different firewall and/or network. For example, each of the external databases may be on a separate network and behind a separate firewall. The external databases may further be based on and/or operated by different platforms (e.g., software applications, software operating systems, etc.). Thus, each of the external databases may be associated with a different entity at different locations (e.g., network locations) where each of the locations comprises a different firewall and a different platform for operating the external databases. In some embodiments, the entities associated with the external databases may not access each of the other external databases. For example, each of the external databases may operate without knowing of or connecting with any of the other external databases. As such, each external database may be considered independent of each of the other external databases and the external databases may further be considered widely dispersed databases. For example, a first external database may be a database associated with a governmental entity, a second external database may be a database associated with an enterprise software system of a first corporation, and a third external database may be a database associated with an enterprise software system of a second corporation. As such, the external databases may be queried and data received from the external databases may be organized into data fields of one or more dynamic tiles such that a single dynamic tile may comprise queried data from a plurality of external databases.

As such, a first user may initiate a transaction that comprises collaborative activities between a plurality of users. In some embodiments, a user platform may provide each of the users associated with the transaction with different amounts of information to complete a task associated with the transaction. For example, the amount of information available to each of the users may be based on a first user action (e.g., selecting specific information available to each user), the transaction or activity that each of the users is to perform to complete the transaction, and a type of the user (e.g., whether the user is a broker, shipper, seller, etc.). Further details with regard to a user interface for such an environment are disclosed with regard to FIG. 3 and further details with regard to methods to support sharing of information based on a transaction are disclosed with regard to FIGS. 2 and 4-6.

Figure 2:
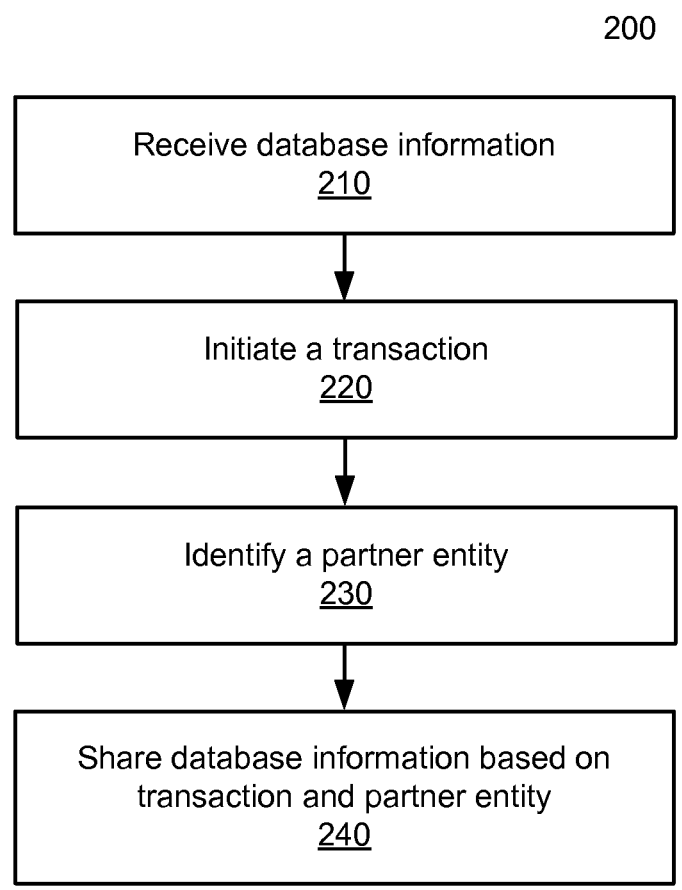
FIG. 2 is a flow diagram of an example method for sharing database information for a transactional-based workflow collaboration platform.

FIG. 2 is a flow diagram of an example method 200 for sharing database information for a transactional-based workflow collaboration platform. In general, the method 200 may be performed by a user platform (e.g., user platform 150) in order to facilitate a transactional-based workflow (e.g., associated transactions 115, 125, and/or 135).

As shown in FIG. 2, the method 200 may receive, at step 210, database information. For example, a user platform (e.g., user platform 150) may receive information from a database (e.g., database 160). In some embodiments, the database information may be associated with a transaction. For example, the database information may comprise data specifying shipment information, product information, import and/or export information, and partner entity information. At step 220, a transaction may be initiated. For example, a user (e.g., as discussed with regard to FIG. 1) may initiate or create a transaction (e.g., transaction 115, 125, and/or 135) by using a user platform (e.g., user platform 150). In some embodiments, the initiation of a transaction may comprise a user identifying a product and a partner entity to which to ship the product and the input of other information associated with the transaction. In some embodiments, at step 230, a partner entity may be identified. For example, the user who has initiated the transaction (e.g., from step 220) may specify one or more partner entities to perform a task or assignment associated with the transaction. Furthermore, at step 240, database information (e.g., from database 160) may be shared based on the transaction and the partner entity. For example, data from the database may be shared based on the transaction that has been initiated at step 220 and the partner entity viewing the initiated transaction. In some embodiments, the data may be shared based on a role of the partner entity. For example, a partner entity having a first role (e.g., seller) may have data shared based on a role as a seller and a second partner entity having a second role (e.g., receiver) for the transaction may have different data shared based on a role as a receiver.

As such, the method 200 may initiate a transaction and share data (e.g., data fields from a user platform 150 coupled to database 160) based on a transaction and a partner entity. In some embodiments, different data may be shared based on the transaction and partner entity. For example, an user who has initiated the transaction may view all of the data from the user platform 150 that is associated with the transaction and a partner entity (e.g., a receiver or sender of a product) may only view a subset or more limited amount of the data from the user platform 150 that is associated with the transaction. Thus, different partner entities or users of the user platform 150 may view different data (e.g., data fields) for a transaction.

FIG. 3 depicts an example user interface 300 for a user of a transactional-based workflow collaboration platform in accordance with some embodiments. In general, a user platform (e.g., user platform 150) may display the user interface 300 to a user associated with a transaction (e.g., transaction 115, 125, and/or 135). In some embodiments, the user interface 300 may comprise a plurality of data fields and/or entries. In the same or alternative embodiments, a data field may be shared between a plurality of users or entities. Furthermore, the user interface 300 may be executed as a web application on the user platform (e.g., user platform 150) that is accessible over a network by a plurality of users. As such, a plurality of users may use a user platform 150 to view information associated with a transaction.

As shown in FIG. 3, the user interface 300 may comprise a plurality of dynamic tiles for displaying a plurality of types of information. In some embodiments, each of the dynamic tiles comprises one or more data fields. Furthermore, the dynamic tiles may be shared between a plurality of users. In some embodiments, the sharing between a plurality of users may be performed to the granularity of a specific data field of a specific dynamic tile. Further details with regard to the dynamic tiles and sharing between users are disclosed in further detail below.

In some embodiments, the user interface 300 may comprise a selection tile 305 allowing a user (e.g., an initiator of a transaction and/or a partner entity) to select a transaction (e.g., transaction 115, 125, and/or 135). For example, the selection tile 305 may comprise transaction entries 311, 312, and 313, where each of the transaction entries corresponds to a single transaction. In some embodiments, the selection of a transaction entry may result in the display of dynamic tiles associated with the selected transaction entry. For example, the dynamic tiles may be displayed based on the transaction that has been selected from the selection tile 305 by a user. In some embodiments, the user interface 300 may comprise a plurality of dynamic tiles for organizing information associated with the transaction. For example, the user interface may comprise a transaction details tile 320, shipping label tile 330, packing list tile 340, commercial invoice tile 350, uploaded documents tile 360, transaction wizard tile 365, transaction comments tile 370, user access tile 380 (to show partner entities associated with the transaction), and additional documents tile 390. As such, the dynamic tiles may comprise an organization of information or data associated with a transaction.

In some embodiments, a user may create or initiate a transaction associated with a plurality of users. For example, the transaction may comprise a task of shipping a product with the collaboration of a plurality of users. In the same or alternative embodiments, the user interface 300 may be used to display and share information based on the transaction and a user associated with the transaction. For example, each of the transactions associated with the entries 311, 312, and 313 may be created or initiated by a first user. In some embodiments, the first user may input data into the dynamic tiles of the user interface 300 for a particular transaction. For example, the first user may input data for the shipping label tile 330, packing list tile 340, commercial invoice tile 350, etc. Next, the first user may share at least some of the information displayed in the dynamic tiles of the user interface 300 with a second user that is associated with the transaction. For example, the first user may share information with the second user so that the second user may ship a product associated with the transaction. As such, the first user may share an entire dynamic tile (e.g., packing list tile 340) with the second user or a single data field of a dynamic tile. For example, the first user may share any one of data fields 331, 332, 333, and 334 of the shipping label tile 330 with the second user. As such, the granularity of sharing as defined by the first user may be at the level of a single data field of the dynamic tiles.

In some embodiments, the dynamic tiles or data fields of dynamic tiles may be shared between a plurality of users. For example, a user interface 300 for an initiator of the transaction may comprise the packing list tile 340. Furthermore, a user interface for a second user associated with the transaction may comprise the packing list tile 340. As such, the first user and the second user may be considered to share the packing list tile 340. In some embodiments, each of the first user and the second user may be able to modify at least one data field of the packing list tile 340. In the same or alternative embodiments, the first user and/or the second user may be alerted or notified in response to a modification of a shared data field. Further details with regard to a modification of a shared data field are disclosed with regard to FIG. 4.

In some embodiments, the user interface 300 may comprise a transaction wizard tile 365. In the same or alternative embodiments, the transaction wizard tile 365 may comprise information indicating an action that needs to be performed by a user (e.g., a partner entity). For example, the transaction wizard tile 365 may indicate a task that a partner entity may need to perform. In some embodiments, an initiator of the transaction or other partner entity may specify a task for another partner entity to perform. In the same or alternative embodiments, the task may comprise inputting information necessary to complete the transaction. Further details with regard to assigning a task to facilitate the transaction are disclosed with regard to FIG. 5.

In some embodiments, an initiator of the transaction may share a data field or dynamic tile with a first partner entity. For example, the initiator of the transaction may share the packing list tile 340 with the first partner entity such that the packing list tile 340 may be displayed in a user interface for the first partner entity. In some embodiments, the first partner entity may seek to share the packing list tile 340 with a second partner entity to collaboratively complete the transaction. For example, the first partner entity may seek to share the packing list tile 340 with a second partner entity such that the packing list tile 340 may be displayed in a user interface for the second partner entity. In some embodiments, such sharing may be controlled by the initiator of the transaction. Further details with regard to controlling sharing of information are disclosed with relation to FIG. 6.

In some embodiments, the dynamic tiles as shown in FIG. 3 display information from a plurality of disparate sources (e.g., databases associated with different entities at different locations and different firewalls and/or networks) and information from at least one user or entity to facilitate a transaction. In some embodiments, each of the dynamic tiles comprises one or more data fields that display information from one or more databases. As such, the organization of data from widely dispersed databases may be based on the use of the dynamic tiles of the user interface 300.

In some embodiments, the selection of a different entry (e.g., entry 311, 312, and/or 313) may result in the dynamic changing of the dynamic tiles. For example, if a user has selected entry 311, the dynamic tiles may display data fields associated with the transaction of entry 311. However, if the user clicks on the entry 312, the dynamic tiles may automatically update to reflect the data fields associated with the transaction of entry 712. In some embodiments, the updating may be performed on the same page without any reloading. For example, the clicking on the entries 311, 312, or 313 may be enabled such that a webpage comprising the user interface 300 does not reload in response to each click of an entry. Instead, the dynamic tiles may be updated immediately on the user interface on the webpage without reloading the webpage. Furthermore, the clicking from one entry to another in the user interface 300 may result in the dynamic querying of one or more databases. For example, if a user clicks on entry 311, a plurality of databases may be queried for information regarding the transaction of the entry 311. Received information may be organized into the data fields of the dynamic tiles. Next, if a user clicks on the entry 313, the plurality of databases may be queried again for information regarding the transaction of the entry 313. The new information regarding the transaction of the entry 313 may also be organized into the data fields of the dynamic tiles.

In some embodiments, the dynamic tiles as shown in FIG. 3 may each display a portion of a database associated with the user interface 300. For example, each of the dynamic tiles of the user interface 300 may display one or more data fields that have been received and organized from a plurality of databases. In some embodiments, each of the dynamic tiles may be associated with a query. For example, the dynamic tile 330 may be associated with a first query for the database associated with the user interface 300 and the dynamic tile 340 may be associated with a second query for the database associated with the user interface 300. In some embodiments, the queries for each of the dynamic tiles are a query for the data associated with the data fields of the dynamic tiles. For example, the query for dynamic tile 330 may request data associated with data fields and the query for dynamic tile 340 may request data associated with the other data fields. In some embodiments, the queries for the dynamic tiles are executed or run whenever a data field of the user interface 300 (e.g., a data field displayed by a dynamic tile) is modified or a selection is made (e.g., a selection of entry 311, 312, and/or 313) in the user interface 300. As such, the dynamic tiles may respond to any change or input to the user interface 300. In some embodiments, the dynamic tiles may automatically update (e.g., reflect new data in the data fields) without refreshing a webpage comprising the user interface 300.

As such, the dynamic tiles may each be associated with a view of particular data of a database comprising organized information from a plurality of external databases. In some embodiments, the dynamic tiles may execute a query to the database in response to a change or user selection of a data field or entry of the user interface 300. As such, a user does not have to input a query as the dynamic tiles may automatically execute a query in response to the change of a data field or the user selection of an entry.

In some embodiments, a user may input and/or define a dynamic tile. For example, a user may input and/or select data fields to be comprised within a dynamic tile. In some embodiments, the selected data fields for a user defined and created dynamic tile may comprise data fields associated with a plurality of databases (e.g., disparate sources from a plurality of entities at a plurality of network locations where each of the network locations is associated with a different firewall). In some embodiments, the created dynamic tile may be shared with other users as further discussed with regard to FIG. 6. As such, a user of the user interface 300 may create a dynamic tile comprising a plurality of data fields. In some embodiments, the created dynamic tile may be a grouping of data fields from one or more external databases. Furthermore, the user may share the created dynamic tile and the data fields of the dynamic tile with a second user. As such, the user may share the dynamic tile and effectively share information (e.g., data fields) with a second user.

Although the above disclosure of the user interface 300 discloses information to facilitate an import and export environment, the user interface and following methods are not limited to such an import and export environment. The user interface 300 and following methods are merely described within an import and export environment for exemplary purposes and are not intended to be limited to an import and export environment.

Figure 4:
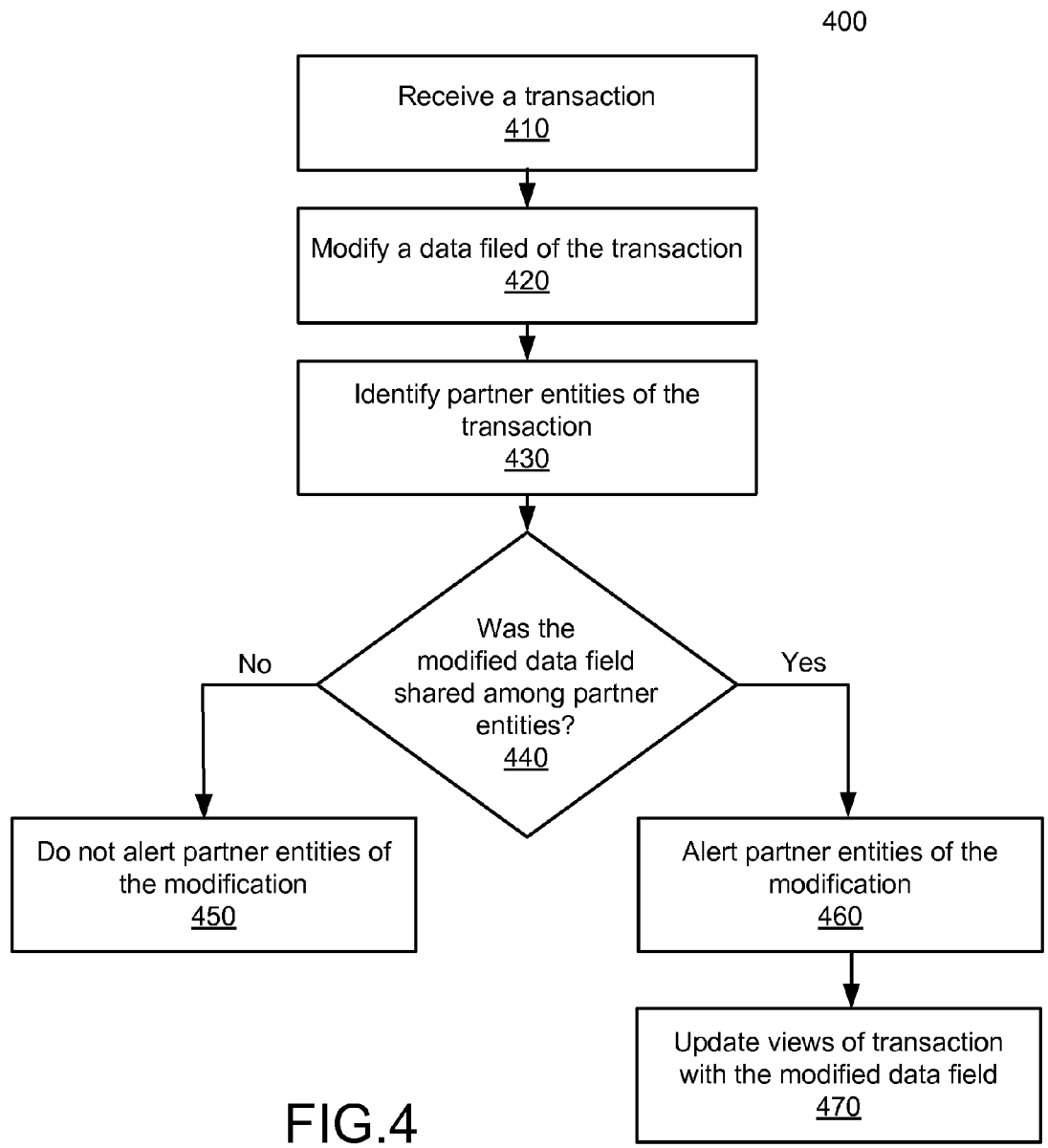
FIG. 4 is a flow diagram of an example method for modifying a data field associated with a transaction in accordance with some embodiments of the disclosure.

FIG. 4 is a flow diagram of an example method 400 for modifying a data field associated with a transaction in accordance with some embodiments of the disclosure. In general, the method 400 may be performed by a user platform (e.g., user platform 150) and comprise the modification of a data field from a user interface (e.g., user interface 300) and the alerting of a modification of the data field to at least one partner entity.

As shown in FIG. 4, the method 400 may receive, at step 410, a transaction. For example, the method 400 may receive an input from a user (e.g., a selection of an entry of a user interface from a user) specifying at least one transaction (e.g., transaction 115, 125, and/or 135). At step 420, a data field of the transaction may be modified. For example, a user (e.g., partner entity) of the user platform (e.g., user platform 150) may modify or change a data field of a user interface (e.g., user interface 300) associated with the transaction. In some embodiments, the modification of the data field comprises the changing of a value or data of the data field. At block 430, partner entities of the transaction may be identified. In some embodiments, the partner entities that are associated with the transaction may be identified in response to the modification of the data field. In the same or alternative embodiments, each transaction may be associated with one or more partner entities. As such, a plurality of partner entities may be identified in response to the modification of the data field. At step 440, a determination may be made as to whether the modified data field was shared among partner entities. In some embodiments, if the modified data field was not shared with at least one other partner entity, then at step 450, no other partner entities associated with the transaction may be alerted of the modification. However, if the modified data field was shared with at least one other partner entity, then at step 460, the other partner entity may be alerted of a modification of the data field. In some embodiments, the alert of the modification of the data field may comprise an indication of who (e.g., which partner entity) modified the data field, the specific data field that was modified, and/or the transaction associated with the modified data field. As such, any other partner entity that is associated with the modified data field (e.g., who may view the modified data field in a user interface 300) may be alerted of the modification of the data field at step 460. Furthermore, at step 470, the view (e.g., user interface) of the transaction for the partner entity may be updated to reflect the modified data field.

As such, in some embodiments, a modification of a data field of a transaction may be received. In some embodiments, the transaction may be associated with a plurality of partner entities. In the same or alternative embodiments, the data field that has been modified may be associated (e.g., shared) by a plurality of partner entities. For example, the modified data field may comprise product information, shipment information, or other information for a partner entity to complete or contribute to the completion of the transaction. If the modified data field is shared with a partner entity, then the partner entity may receive an alert or notification of the modification of the data field.

Figure 5:
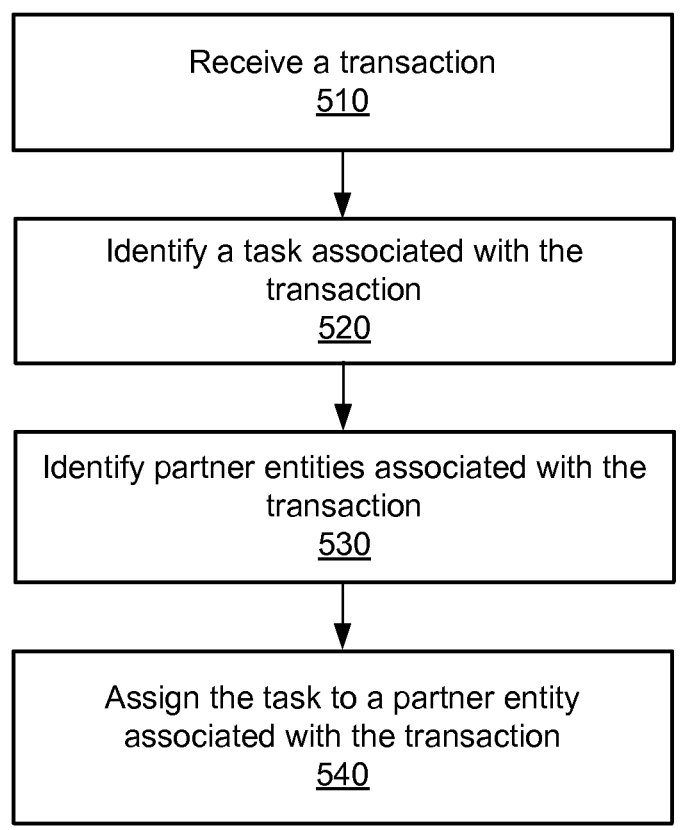
FIG. 5 is a flow diagram of an example method for assigning a task in accordance with some embodiments.

FIG. 5 is a flow diagram of an example method 500 for assigning a task in accordance with some embodiments. In general, the method 500 may assign a task associated with a transaction to a partner entity. In some embodiments, a user platform (e.g., user platform 150) may perform the method 500.

As shown in FIG. 5, at step 510, a transaction may be received and/or identified. For example, a user may select an entry associated with a transaction in a user interface of a user platform (e.g., user platform 150). At step 520, a task associated with the transaction may be identified. In some embodiments, a task may comprise an assignment to be completed by a partner entity associated with a transaction. For example, in some embodiments, the task may be for a partner entity to provide information or data regarding the transaction. In some embodiments, the data may comprise product information (e.g., an HTS code for a product), shipping information, or any other information needed to complete the transaction. As such, the task may comprise an action that needs to be taken by at least one partner entity for a transaction. In some embodiments, a user or administrator may assign the task. At step 540, the task may be assigned to at least one partner entity associated with the transaction. For example, a user may select a partner entity associated with the transaction such that the selected partner entity may be notified of the assignment of the task and may complete the task to facilitate the transaction.

As such, the method 500 may assign a task associated with a transaction to at least one partner entity associated with the transaction. In some embodiments, the task may comprise inputting information for the transaction. In the same or alternative embodiments, once the partner entity, for whom the task has been assigned, inputs the information for the transaction, other partner entities associated with the transaction who also share the information may view the inputted information.

Figure 6:
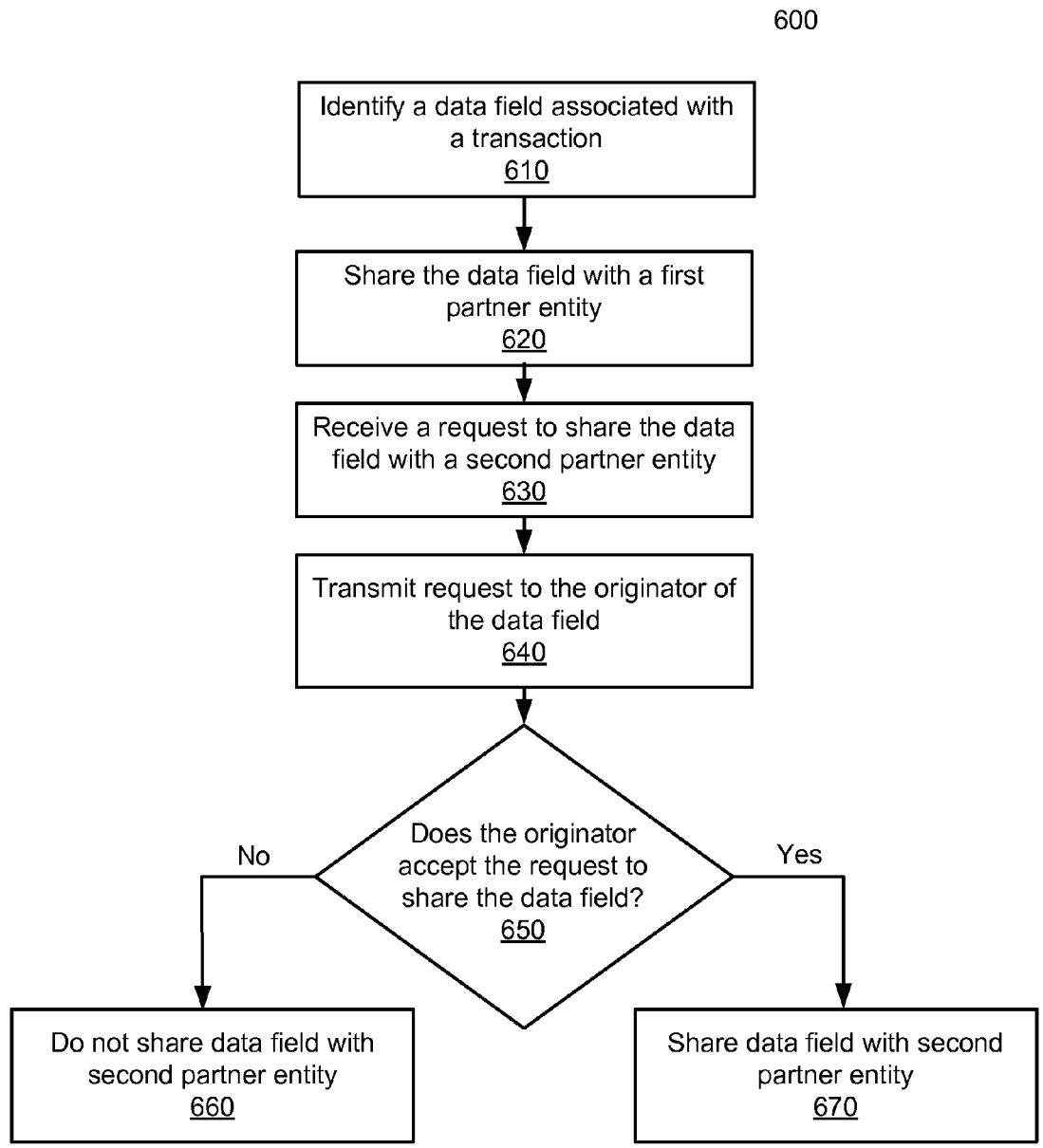
FIG. 6 is a flow diagram of an example method for restricting the sharing of data in accordance with some embodiments.

FIG. 6 is a flow diagram of an example method 600 for restricting the sharing of data in accordance with some embodiments. In general, the method 600 may be executed to share a data field between an originator of the data field and a first partner entity and control the sharing of the data field by the first partner entity with a second partner entity. In some embodiments, the method 600 may be performed by a user platform (e.g., user platform 150).

As shown in FIG. 6, at step 610, a data field may be identified. For example, a user may select a data field from a user interface (e.g., user interface 300) associated with a transaction. At step 620, a data field may be shared with a first partner entity. For example, the identified data field associated with a transaction may be shared with a first partner entity by an originator of the data field such that a user interface associated with the first partner entity may display the shared data field. At step 630, a transmittal request of the shared data field may be received. For example, a request from the first partner entity to share the data field (e.g., from step 620) with a second partner entity may be received. Next, at step 640, a request may be transmitted to the originator of the data field. For example, in response to the request from the first partner entity to share the data field with the second partner entity, an originator of the data field may be alerted or notified of the request from the first partner entity to share the data field with the second partner entity. In some embodiments, the alert or notification to the originator of the data field may comprise an email or a text message. At step 650, a determination may be made as to whether the originator of the data field accepts the request to share the data field with the second partner entity. In some embodiments, if the originator does not accept the request to share the data field with the second partner entity, then at step 660, the data field may not be shared with the second partner entity. However, if the originator does accept the request to share the data field with the second partner entity, then at step 670, the data field may be shared with the second partner entity.

In some embodiments, an email may be shared and subject to the method 600. As such, an originator of the email may share the email with a first partner entity and the first partner entity may request to share the email with a second partner entity. In some embodiments, the originator may be notified of the request to share the email with the second partner entity and the originator may accept or decline the request. Furthermore, in some embodiments, the originator may request additional information before accepting or declining the request to share the email or data field with the second partner entity.

As such, in some embodiments, the method 600 may be used to prevent or allow a chain-linked viewing of data (e.g., an email or a data field of a user interface) between a plurality of users. For example, a first user may input data (e.g., an email or data corresponding to a data field) and indicate an action to share the data with a second user. In some embodiments, the second user may view the data shared by the first user and may indicate an action to share the data with a third user. As such, the second user may provide a request to share data that has been shared with the second user to a third user. In some embodiments, the determination to share the data with the third user may be based on an acceptance by the first user.

Figure 7:
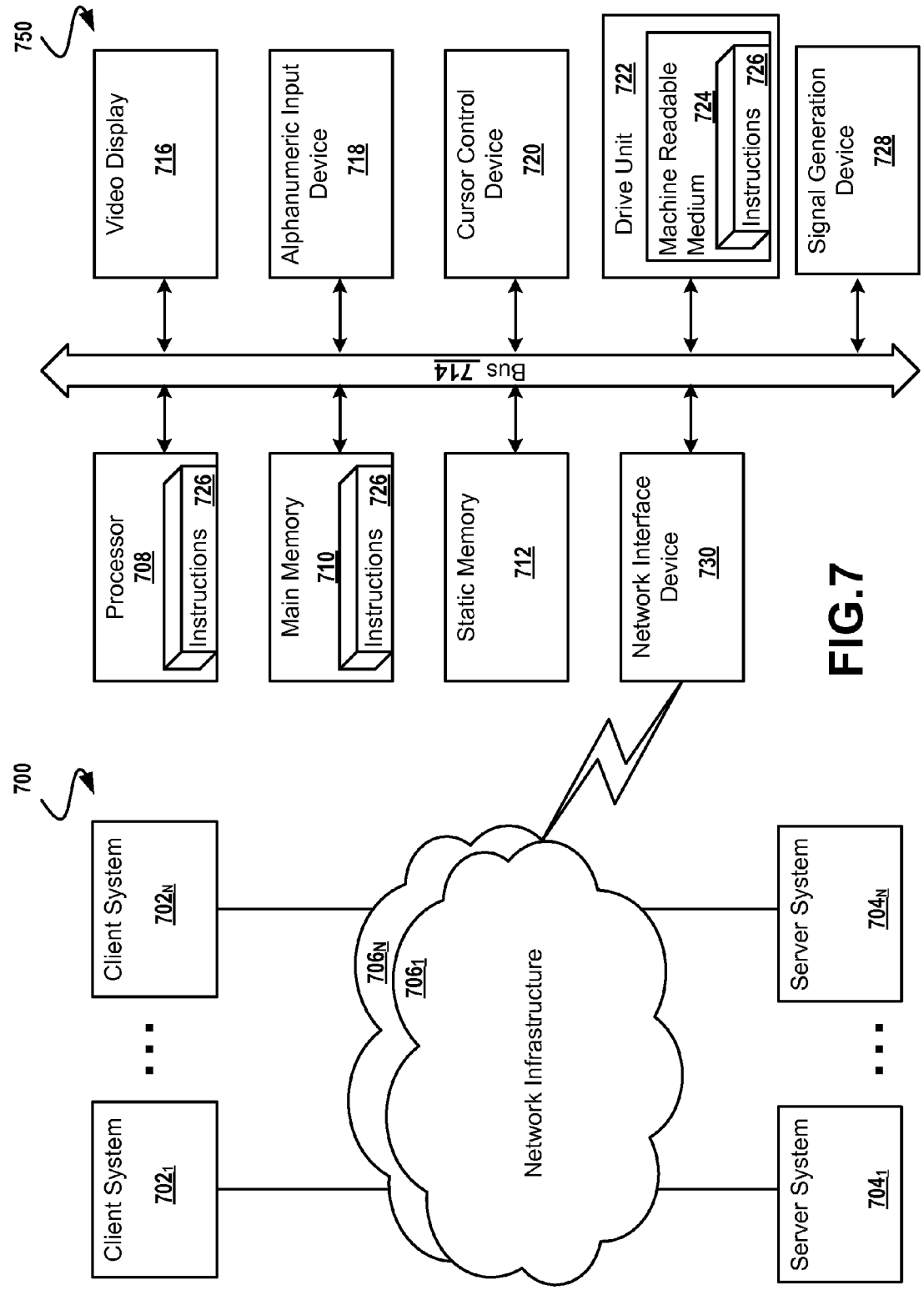
FIG. 7 depicts a diagram illustrating an exemplary computing system for execution of the operations comprising various embodiments of the disclosure.

FIG. 7 depicts a diagram illustrating a network 700 for execution of the operations comprising various embodiments of the disclosure. The diagrammatic representation of the network 700, including nodes for client computer systems $702_1$ through $702_N$, nodes for server computer systems $804_1$ through $804_N$, nodes for network infrastructure $706_1$ through $706_N$, any of which nodes may comprise a machine 850 within which a set of instructions for causing the machine to perform any one of the techniques discussed above may be executed. The embodiment shown is purely exemplary, and might be implemented in the context of one or more of the figures herein.

Any node of the network 700 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 750 includes a processor 708 (e.g. a processor core, a microprocessor, a computing device, etc.), a main memory 710 and a static memory 712, which communicate with each other via a bus 714. The machine 750 may further include a display unit 816 that may comprise a touchscreen, or a liquid crystal display (LCD), or a light emitting diode (LED) display, or a cathode ray tube (CRT). As shown, the computer system 750 also includes a human input/output (I/O) device 718 (e.g., a keyboard, an alphanumeric keypad, etc.), a pointing device 820 (e.g., a mouse, a touch screen, etc.), a drive unit 722 (e.g. a disk drive unit, a CD/DVD drive, a tangible computer readable removable media drive, an SSD storage device, etc.), a signal generation device 728 (e.g. a speaker, an audio output, etc.), and a network interface device 730 (e.g. an Ethernet interface, a wired network interface, a wireless network interface, a propagated signal interface, etc.).

The drive unit 7822 includes a machine-readable medium 724 on which is stored a set of instructions (i.e. software, firmware, middleware, etc.) 726 embodying any one, or all, of the methodologies described above. The set of instructions 726 is also shown to reside, completely or at least partially, within the main memory 710 and/or within the processor 708. The set of instructions 726 may further be transmitted or received via the network interface device 730 over the network bus 714.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Figure 8:
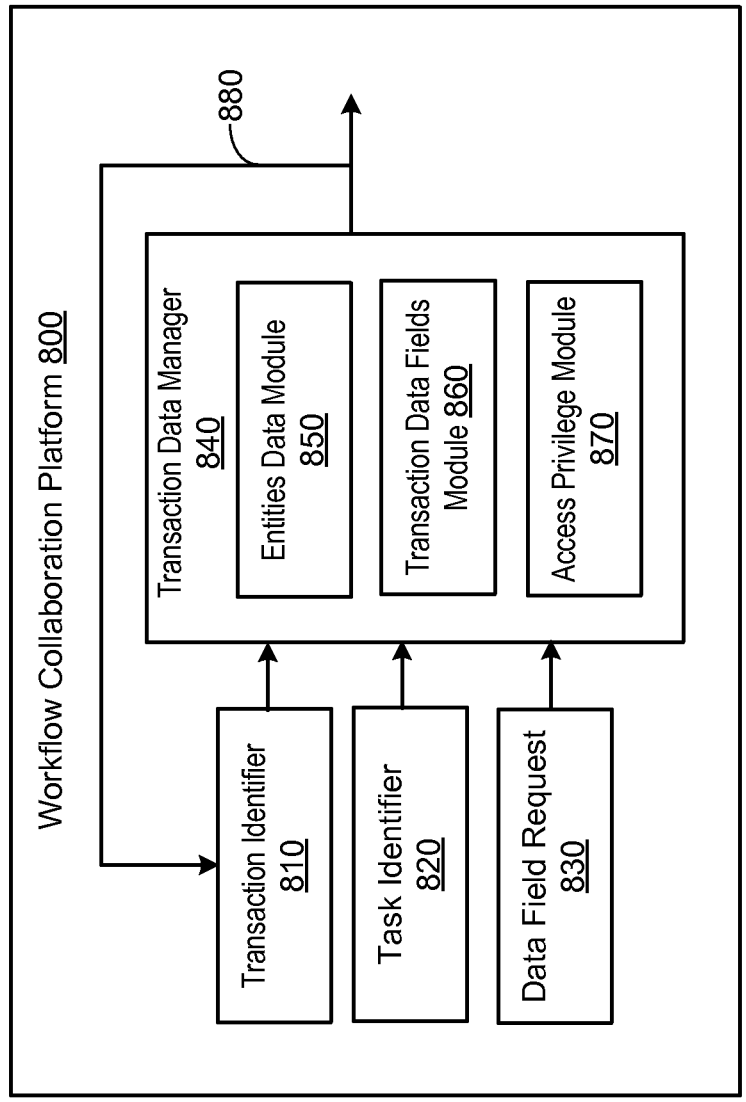
FIG. 8 depicts an example system for sharing database information for a transactional-based workflow collaboration platform.

FIG. 8 depicts an example system for sharing database information for a transactional-based workflow collaboration platform. In general, the workflow collaboration platform 800 may be used to implement the systems and methods as previously discussed.

As shown in FIG. 8, the workflow collaboration platform 800 may comprise a transaction data manager 840. In some embodiments, the transaction data manager 840 may comprise an entities data module 850 and a transaction data fields module 860. In the same or alternative embodiments, the entities data module 850 may comprise data associated with entities (e.g., partner entities) associated with one or more transactions and the transaction data fields module 860 may comprise data associated with data fields of transactions. The transaction data manager 840 may further receive transaction identifier data 810, task identifier data 820, and data field request 830. In some embodiments, the received data may be used by the access privilege module 870 to determine which data fields (e.g., data fields from the transaction data fields module 860) the data output 880 should comprise. For example, the access privilege module 870 may use the transaction identification, task identifier, and a specific data field request to determine whether an entity requesting the data field has an access privilege to the requested data field.

What is claimed is:

1. A computer-implemented method to share data associated with a transaction, the method comprising:
   storing, in one or more computers, a plurality of data fields for at least one transaction associated with an enterprise entity, wherein a transaction is associated with one or more tasks related to the transaction, and wherein each of the tasks is associated with at least one of the data fields;
   receiving, over a network, from at least one computer for a first partner entity, a request to initiate a task associated with the transaction and to receive access privilege to a first data field associated with the task so as to allow the first partner entity to collaborate on the transaction with the enterprise entity;
   receiving, over the network, from at least one computer for the first partner entity, a request to access the first data field; and
   granting access to the computer of the first partner entity to the first data field.

2. The computer-implemented method as set forth in claim 1, wherein:
   receiving from the first partner entity a request to access the first data field comprises receiving a request, from the computer of the first partner entity, to view the data field; and
   granting access to the request from the computer of the first partner entity to the first data field comprises granting access to the request to transfer the contents of the data field to the computer of the first partner entity.

3. The computer-implemented method as set forth in claim 1, wherein:
   receiving from the first partner entity a request to access the first data field comprises receiving a request, from the computer of the first partner entity, to write a new value to the data field; and
   granting access to the request from the computer of the first partner entity to the first data field comprises granting access to the request to update the contents of the data field.

4. The computer-implemented method as set forth in claim 1, wherein assigning an access privilege to a first data field of the plurality of data fields associated with the transaction comprises assigning privileges to at least one data field based on roles, wherein a first role and a second role are associated with different available data fields.

5. The computer-implemented method as set forth in claim 1, wherein a first data field is available to a first user and a second user, the method further comprising:
   receiving a modification to the first data field from the first user; and
   transmitting a notice to the second user in response to the modification to the first data field by the first user.

6. The computer-implemented method as set forth in claim 1, the method further comprising:
   assigning a task to the first user, the task comprising at least one data field for the first user to input information; and
   transmitting a notice to the first user in response to the assigning of the task.

7. The computer-implemented method as set forth in claim 1, wherein a first data field is available to the first user, the method further comprising:
   receiving an input from the first user to share the first data field with a second user; and
   transmitting a notice to the enterprise entity in response to receiving the input from the first user to share the first data field with the second user.

8. The computer-implemented method as set forth in claim 7, further comprising:
   receiving an input from the second user to share the first data field with a third user; and
   transmitting a notice to the enterprise entity in response to receiving the input from the second user to share the first data field with the third user.

9. The computer-implemented method as set forth in claim 8, further comprising:
   receiving, from the enterprise entity computer, a notice in response to the input from the second user to share the first data field with the third user a request to grant access the first data field to the third user; and
   setting access privileges to allow the third user to access the first data field.

10. The computer-implemented method as set forth in claim 1, wherein the transaction comprises a transaction that facilitates an import/export trade compliance workflow.

11. A non-transitory computer readable medium carrying one or more instructions to share data associated with a transaction, wherein the one or more instructions, when executed by one or more processors, causes the one or more processors to:
   store, in one or more computers, a plurality of data fields for at least one transaction associated with an enterprise entity, wherein a transaction is associated with one or more tasks related to the transaction, and wherein each of the tasks is associated with at least one of the data fields;
   receive, over a network, from at least one computer for a first partner entity, a request to initiate a task associated with the transaction and to receive access privilege to a first data field associated with the task so as to allow the first partner entity to collaborate on the transaction with the enterprise entity;
   receive, over the network, from at least one computer for the first partner entity, a request to access the first data field; and
   grant the first partner entity access to the first data field.

12. The non-transitory computer readable medium of claim 11, wherein:
   receiving from the first partner entity a request to access the first data field comprises receiving a request, from the computer of the first partner entity, to view the data field; and
   granting access to the request from the computer of the first partner entity to the first data field comprises granting access to the request to transfer the contents of the data field to the computer of the first partner entity.

13. The non-transitory computer readable medium of claim 11, wherein:
   receiving from the first partner entity a request to access the first data field comprises receiving a request, from the computer of the first partner entity, to write a new value to the data field; and
   granting access to the request from the computer of the first partner entity to the first data field comprises granting access to the request to update the contents of the data field.

14. The non-transitory computer readable medium of claim 11, wherein assigning an access privilege to a first data field of the plurality of data fields associated with the transaction comprises assigning privileges to at least one data field based on roles, wherein a first role and a second role are associated with different available data fields.

15. The non-transitory computer readable medium of claim 11, wherein a first data field is available to a first user and a second user, the method further comprising:
   receiving a modification to the first data field from the first user; and
   transmitting a notice to the second user in response to the modification to the first data field by the first user.

16. The non-transitory computer readable medium of claim 11, the method further comprising:
   assigning a task to the first user, the task comprising at least one data field for the first user to input information; and
   transmitting a notice to the first user in response to the assigning of the task.

17. The non-transitory computer readable medium of claim 11, wherein a first data field is available to the first user, the method further comprising:
   receiving an input from the first user to share the first data field with a second user; and
   transmitting a notice to the enterprise entity in response to receiving the input from the first user to share the first data field with the second user.

18. The non-transitory computer readable medium of claim 17, further comprising:
   receiving an input from the second user to share the first data field with a third user; and
   transmitting a notice to the enterprise entity in response to receiving the input from the second user to share the first data field with the third user.

19. The non-transitory computer readable medium of claim 18, further comprising:
   receiving, from the enterprise entity computer, a notice in response to the input from the second user to share the first data field with the third user a request to grant access the first data field to the third user; and
   setting access privileges to allow the third user to access the first data field.

20. The non-transitory computer readable medium of claim 11, wherein the transaction comprises a transaction that facilitates an import/export trade compliance workflow.

21. A system to share data associated with a transaction, the system comprising at least one processor and memory and one or more instructions, which when executed by the at least one processor, cause the at least one processor to:

store a plurality of data fields for at least one transaction associated with an enterprise entity, wherein a transaction is associated with one or more tasks related to the transaction, and wherein each of the tasks is associated with at least one of the data fields;

receive, over a network, from at least one computer for a first partner entity, a request to initiate a task associated with the transaction and to receive access privilege to a first data field associated with the task so as to allow the first partner entity to collaborate on the transaction with the enterprise entity;

receive, over the network, from at least one computer for the first partner entity, a request to access the first data field; and grant access to the computer of the first partner entity to the first data field.

* * * * *